United States Patent
Lee

(10) Patent No.: US 6,397,208 B1
(45) Date of Patent: May 28, 2002

(54) SYSTEM AND METHOD FOR LOCATING REAL ESTATE IN THE CONTEXT OF POINTS-OF-INTEREST

(75) Inventor: Se-Wai Lee, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/232,923

(22) Filed: Jan. 19, 1999

(51) Int. Cl.[7] .......................... G06F 17/30; G06F 15/00
(52) U.S. Cl. ................... 707/3; 707/4; 707/5; 707/200; 701/208
(58) Field of Search ....................... 707/1–10, 101–103, 707/501; 705/27, 26, 10; 701/200–202, 208, 2.2–2.3

(56) References Cited

U.S. PATENT DOCUMENTS

| 4,870,576 | A | | 9/1989 | Tornetta | 364/401 |
| 5,032,989 | A | * | 7/1991 | Tornetta | 364/401 |
| 5,680,305 | A | * | 10/1997 | Apgar, IV | 364/401 |
| 5,852,810 | A | * | 12/1998 | Sotiroff et al. | 705/27 |
| 6,240,425 | B1 | * | 5/2001 | Naughton | 707/104 |

* cited by examiner

Primary Examiner—Hosain T. Alam
Assistant Examiner—Alford W. Kindred
(74) Attorney, Agent, or Firm—Woodcock Washburn LLP

(57) ABSTRACT

An on-line interactive, Internet-based real estate service that provides property listings in the context of a set of user selected points-of-interest. The real estate service provides a database of properties and a user sets points-of-interest. The real estate service calculates and displays distances between properties selected from the database and the user set points-of-interest. In this way, the user can search for properties in the context of points of interest.

28 Claims, 5 Drawing Sheets

SYSTEM AND METHOD FOR LOCATING REAL ESTATE IN THE CONTEXT OF POINTS-OF-INTEREST

CROSS-REFERENCE TO RELATED APPLICATIONS

This application is related to co-pending U.S. Application Ser. No. 09/234,135, filed on even date herewith, and entitled "USER INTERFACE FOR ON-LINE REAL ESTATE SERVICE" and U.S. Application Ser. No. 09/233,013, filed on even date herewith, and entitled "SYSTEM AND METHOD FOR MATCHING CONSUMERS WITH REAL ESTATE LOAN PRODUCTS ON-LINE."

TECHNICAL FIELD

The present invention relates generally to computer services and more particularly to a system for providing a user of a computerized real estate service with geographic reference information.

BACKGROUND OF THE INVENTION

The Internet is rapidly evolving into a major shopping medium for consumers. Everything, including books, CDs, automobiles, and real estate, can be advertised, auctioned, sold, purchased, or otherwise researched on-line. Moreover, many of these items are offered on a variety of different Internet sites. Hence, the Internet user (i.e., consumer or purchaser) is in the position of choosing among competing Internet sites offering the same or similar goods and services. Thus, to differentiate itself, an Internet site must offer the user some added value.

Real estate shopping is rapidly becoming an important on-line shopping activity. Internet based real estate services offer numerous advantages over traditional real estate services. For example, in traditional real estate shopping, purchasers rely on real estate agents to provide information about properties that meet selected criteria of price and location. Additionally, the purchasers must spend many hours collecting and reviewing various real estate advertising publications. By contrast, Internet real estate services provide the real estate purchaser with much of the same information, some of it once exclusively available to agents, with the click of a mouse button.

Typically, when a prospective real estate purchaser identifies a property of interest, the purchaser learns the property's street address and little else. In such a case, the purchaser must supplement the information provided to better understand the location of the property. For example, the purchaser could rely on the personal knowledge of a real estate agent to learn more precisely the location of the property.

In some on-line real estate services, the purchaser may employ mapping technology to place the property in context geographically, i.e., by plotting a point representing the property on a map of the area. While such mapping technology is useful, it still does not present the purchaser with the information that may be of primary importance. In particular, a purchaser is typically most interested in how far his prospective new home is from the workplace, schools, mass transportation, or like points-of-interest.

Thus, there is a need for an on-line real estate service that provides a prospective purchaser with location information about a prospective property and provides that location information in a context useful to the purchaser.

SUMMARY OF THE INVENTION

The present invention is generally directed to an interactive, Internet-based real estate service that has an integrated property searching service. The real estate service employs a database of real property listings and a user interface permitting users to define points-of-interest. The points-of-interest defined by a particular user are stored and used to calculate distances to properties selected from the property listings database. The distances can be presented in terms of linear distances or driving distances. In this manner, the user may interactively adjust his search criteria while observing how far the newly identified property listings are from the defined points-of-interest.

In an exemplary embodiment of the invention, the buyer identifies one or more points-of-interest by address or from a list generated by the system based on a property of interest. After identifying the points-of-interest, the points are converted to "geocodes," preferably by searching an address-to-geocodes database. A geocode is simply defined as a latitude and longitude pair that correspond to a specific location. A similar conversion process is used to obtain the geocodes for the property of interest. The geocodes of the points-of-interest and the property of interest are then used in an algorithm that determines linear distance, driving distance, or the like, between each point-of-interest and the property of interest. The distance information can then be displayed in a manner usable by the user, for example, to allow the user to compare properties of interest.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

OVERVIEW

Prospective real property purchasers are increasingly shopping for property via the Internet. Internet based real estate services provide database listings of available properties. As such, a purchaser armed with a personal computer can connect to the Internet and browse the property databases provided by the real estate services for available property. If an interesting property is discovered, the user can seek more information about it, such as location information. The location information for the property typically includes only a street address. However even with the street address, unless the purchaser is intimately familiar with the area, the relative location of the property will be unclear.

Techniques such as mapping technology help to place the property in context geographically, e.g., by plotting a point representing the property on a map of the area. The present invention provides the purchaser with more relevant property location information, i.e. in relation to points-of-interest. In particular, the purchaser can search for prospective properties in relation to the office, schools, mass transportation, or like points-of-interest.

EXEMPLARY OPERATING ENVIRONMENT

1. A Computer Environment

Figure 1:
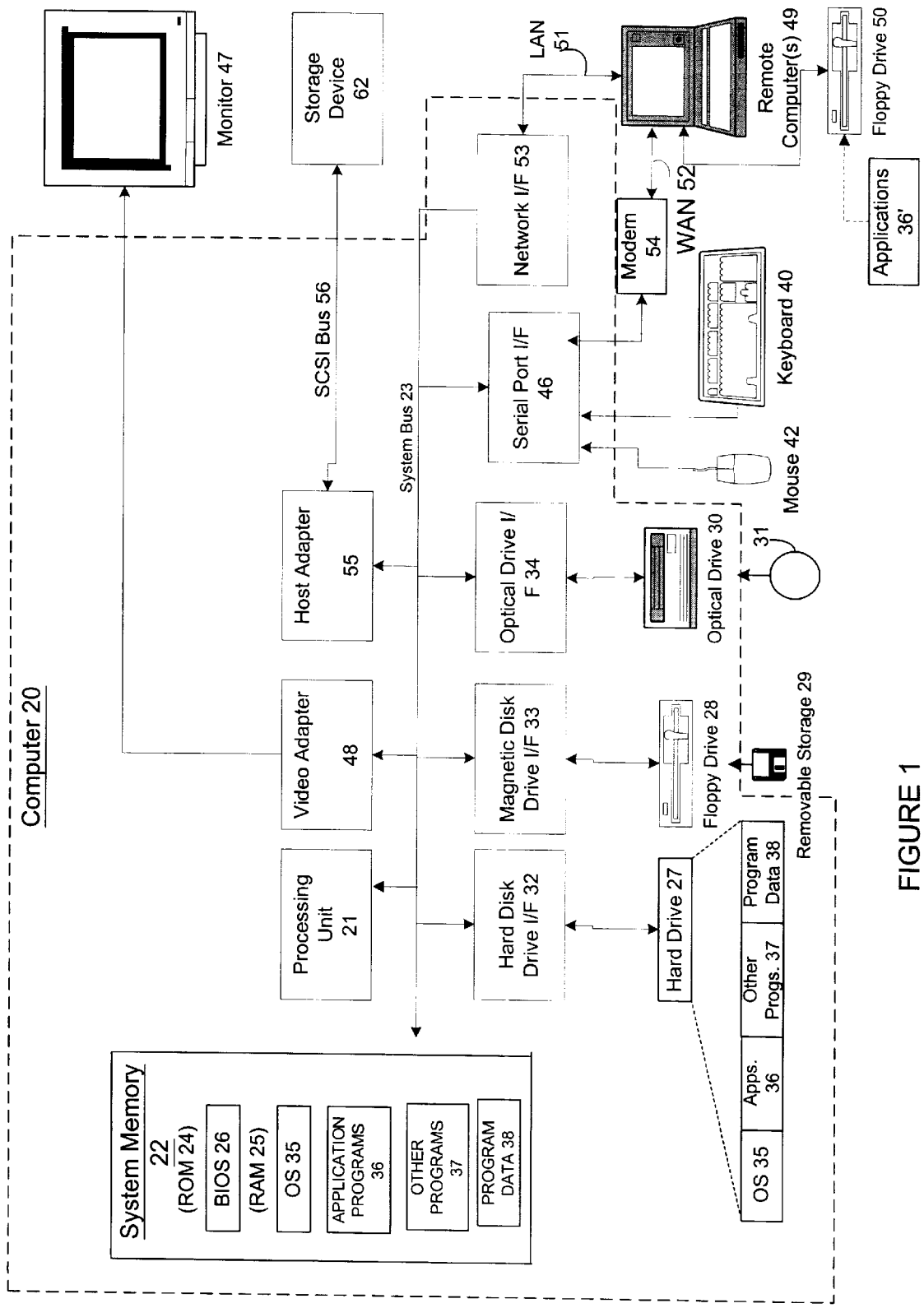
FIG. 1 is a block diagram representing a computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like.

The invention may also be practiced in distributed computing environments where tasks are performed by remote processing devices that are linked through a communications network. In a distributed computing environment, program modules may be located in both local and remote memory storage devices.

As shown in FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. A Network Environment

Figure 2:
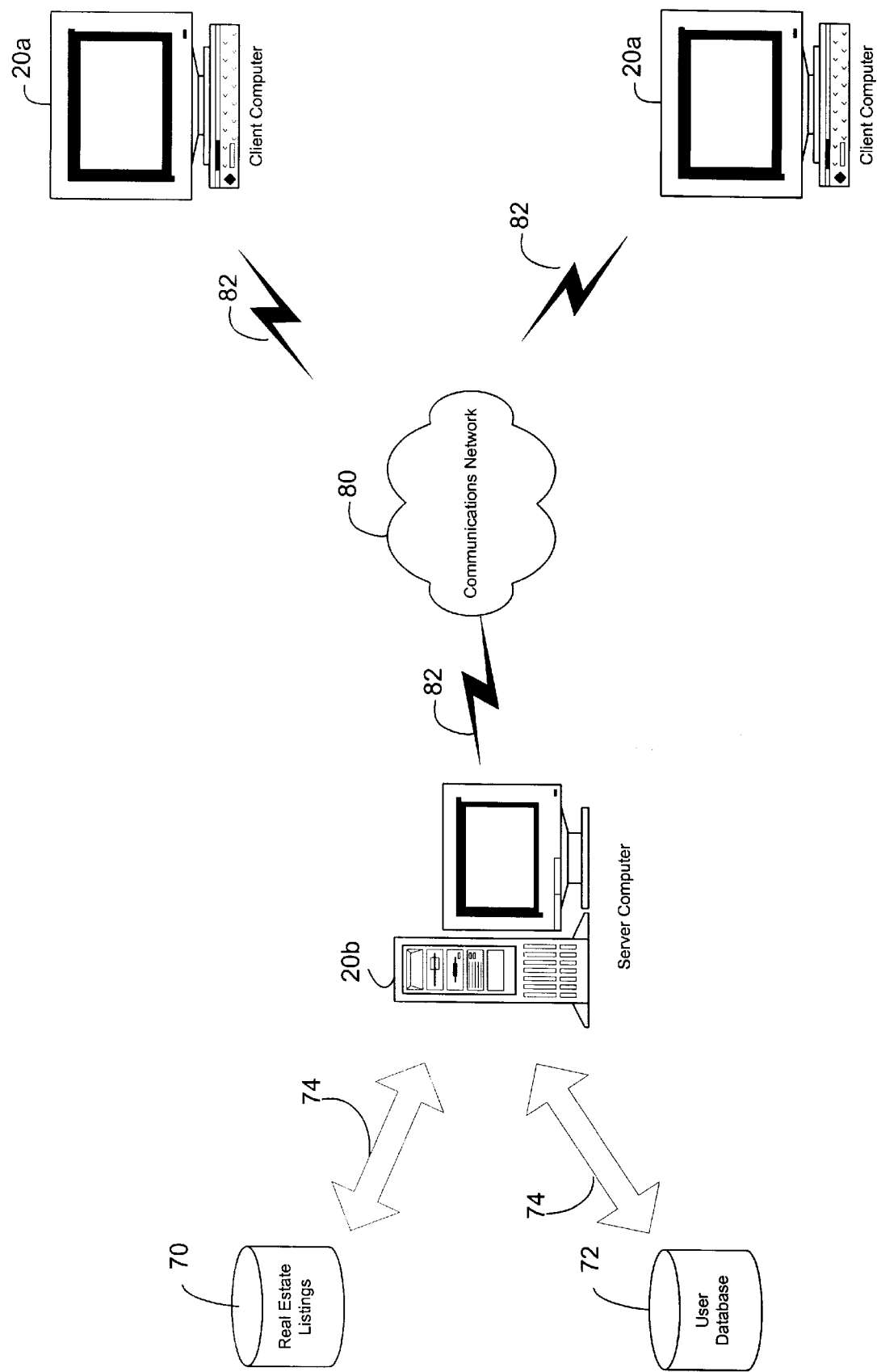
FIG. 2 is a schematic diagram representing a network system in which aspects of the present invention may be incorporated.

As noted, the computer described above can be deployed as part of a computer network. In general, the above description applies to both server computers and client computers deployed in a network environment. FIG. 2 illustrates one such exemplary network environment in which the present invention may be employed. FIG. 2 shows a network including client computers 20a, a server computer 20b, and databases 70 and 72. The client computers 20a are in communication with the server computer 20b via communications network 80, e.g., the Internet. The client computers are connected to the communications network by way of communications interfaces 82. The communications interfaces can be any one of the well-known communications interfaces such as Ethernet connections, modem connections, and so on.

Server 20b has access to databases 70, 72. Database 70 contains the real estate listings for a real estate service and includes property addresses, photographs, and so on. User database 72 contains information stored for individual users of the service, as described more fully below. The databases are shown as coupled to the server 20b via connections 74. However, the databases 70, 72 may reside on server 20b or another server (not shown) connected to communications network 80. For example, user database 72 may be stored locally on client computer 20a and accessible to server 20b via communications network 80. User database 72 allows software executing on the communications network to be customized for individual client computers.

Server computer 20b hosts a real estate service, preferably as an Internet site implemented in HTML, DHTML, or some other Internet development language. Client computer 20a can access and communicate with the real estate server hosted by server 20b via the Internet. Preferably, client computer 20 uses a standard Internet browser to communicate with server computer 20b.

Points-of-Interest Real Estate Locator

Figure 3:
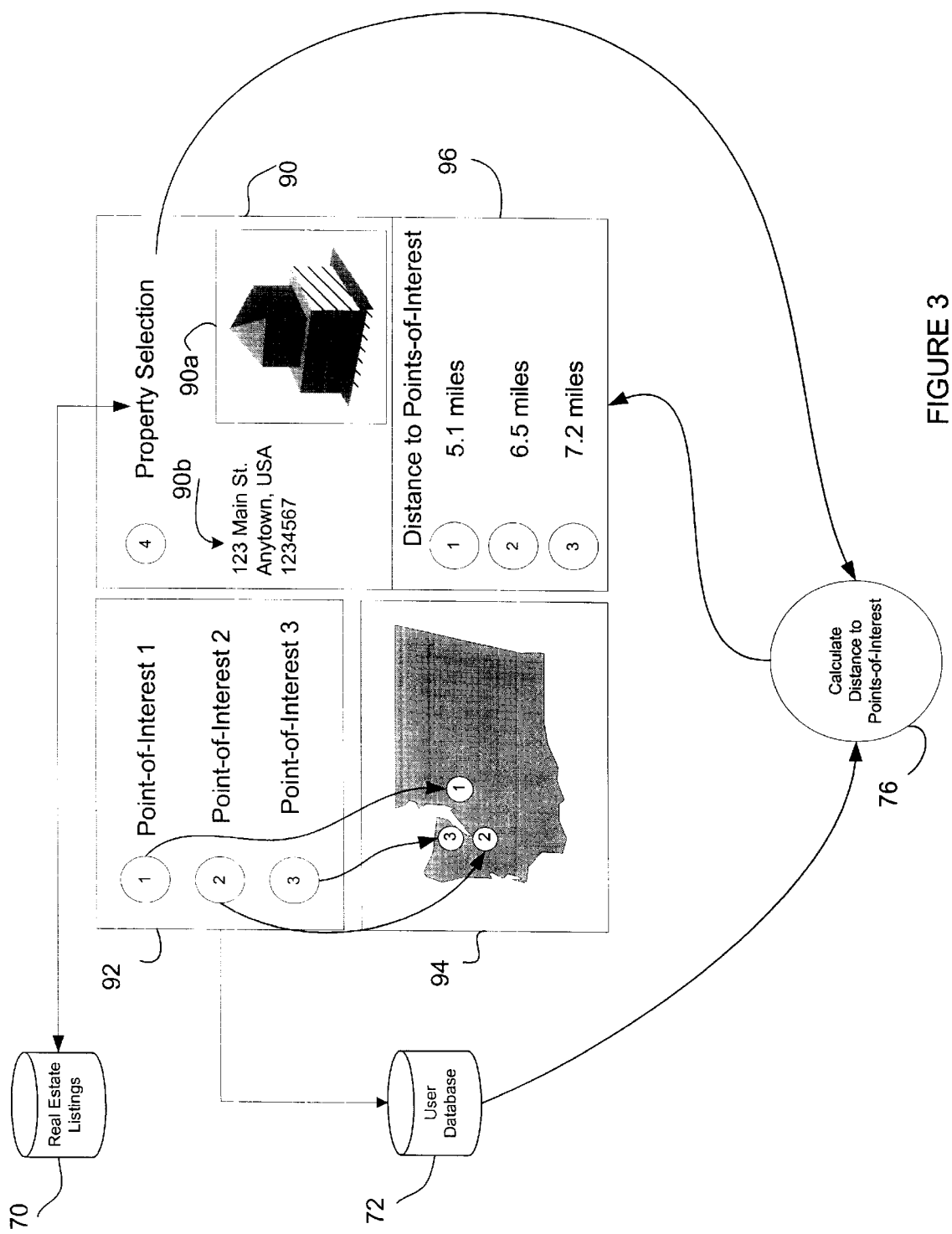
FIG. 3 is a diagram showing the functional operation of the system of the present invention.

FIG. 3 functionally depicts how a user interacts with the real estate service of the present invention. The windows are exemplary windows that may be displayed by the browser. Typically, the user browses for properties in real estate listings database 70 by way of client computer 20a in communication with server computer 20b via the Internet. The property selection (4) from the real estate listings can be based on specific address, general location, price, or other search criteria. When a property of interest is found, the property is displayed in property window 90, shown here displaying a picture of an exemplary property 90a and the exemplary property address 90b.

To put the property in a geographic context that is significant to the user, the user can input a set of points-of-interest (1), (2), and (3). In the example of FIG. 3, the points of interest are input into window 92 as specific addresses known to the user. Alternatively, the points-of-interest can be selected from a list of predefined points-of-interest maintained by the system. Such a list can be based, for example, on the location of selected properties such as zip code, neighborhood, or the like and changed as the selected property is changed.

After the points-of-interest are selected, they can then be rendered on a map or otherwise presented to the user. Here, the points-of-interest are further put in context for the user by rendering all of the points on a single map that is displayed in window 94. After the points-of-interest are input by the user, the system stores them in user database 72. The system then uses the points-of-interest and the selected property to calculate distance information to the points-of-interest, as indicated by process 76. The distance information is then displayed in Distance to Points-of-Interest window 96.

In the present example, the distances are displayed in window 96 as miles between the property selected and each point-of-interest. However, the distance could alternatively be displayed as other distance units such as kilometers, driving distance, straight-line distance (i.e., "as the crow flies"), driving time, or the like. Additionally, or alternatively, driving directions between the points-of-interest and the selected property could be displayed.

According to an aspect of the invention, the points-of-interest persist in the user database 72 until changed by the user. In this way, the user is free to browse the real estate listings database for other properties and to compare the resulting changes in the distance to the points-of-interest among properties selected. Hence, the points-of-interest would serve as a frame of reference while comparing properties.

Figure 4:
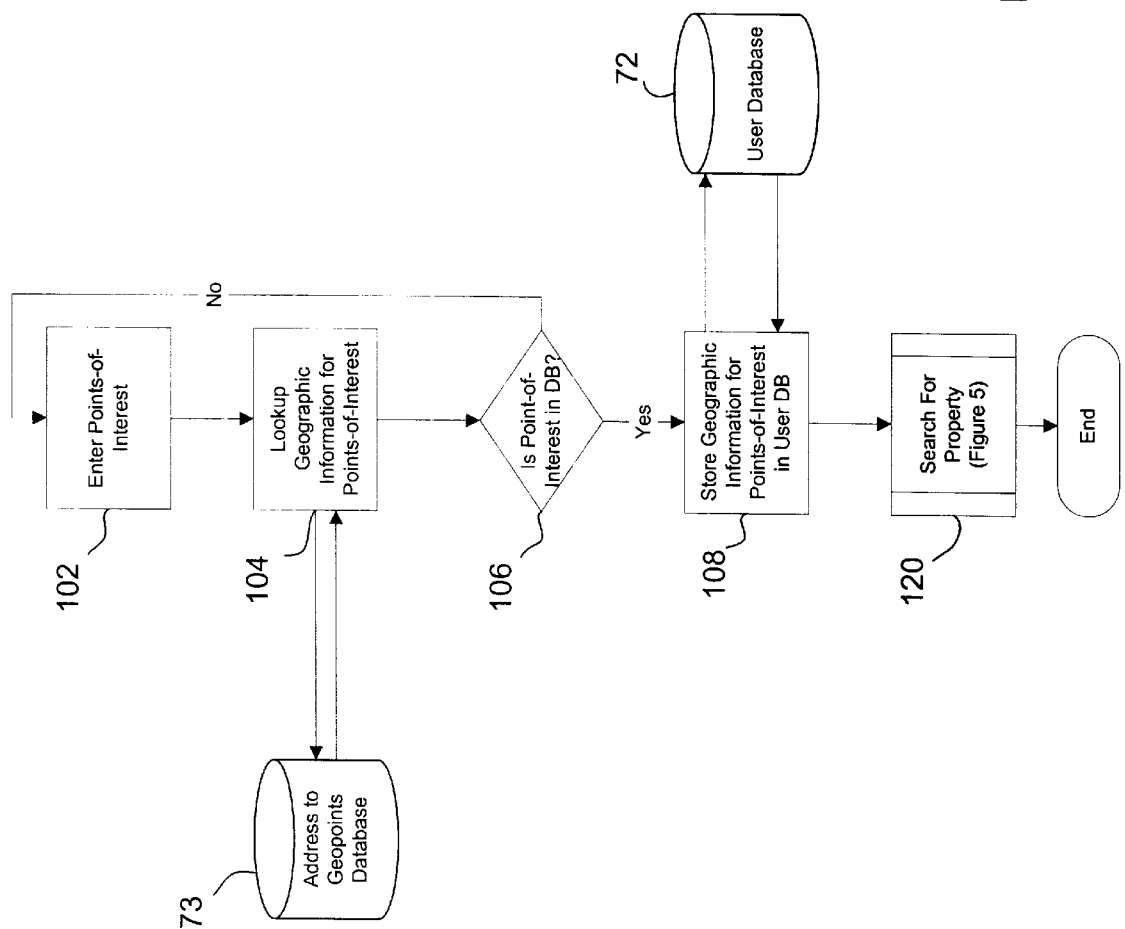
FIG. 4 is a flow diagram in accordance with an aspect of the method of the present invention.

A flow chart depicting the process of locating property in relation to selected points-of-interest is shown in FIG. 4. Preferably, the user first inputs a set of points-of-interest (step 102). The system then retrieves geographic information for the points-of-interest from an address to geographic information database 73 (step 104). For example, if the user inputs a street address for a point-of-interest, the system can search a database such as the Microsoft Streets Database. Preferably, the conversion database will convert the street address into a geocode. For example, longitude and latitude pair 47.6400271567582 and −122.130520057787 represent the geocode that correspond to the address 1 Microsoft Way, Redmond, Wash.

If any of the points-of-interest previously selected by the user do not exist in the conversion database, then the user is informed of the error and given the opportunity to correct it (step 106). On the other hand, if all points-of-interest are in the conversion database then the process proceeds.

The geographic conversion information is then stored in user database 72 for future use (step 108). Preferably, the geocode corresponding to the selected point-of-interest is stored. User database 72 is available to the system executing on server computer 20b (as shown in FIG. 2). Database 72 is preferably stored as a "cookie" file on client computer 20a. The user is then ready to search for property with reference to the points-of-interest (step 120).

Figure 5:
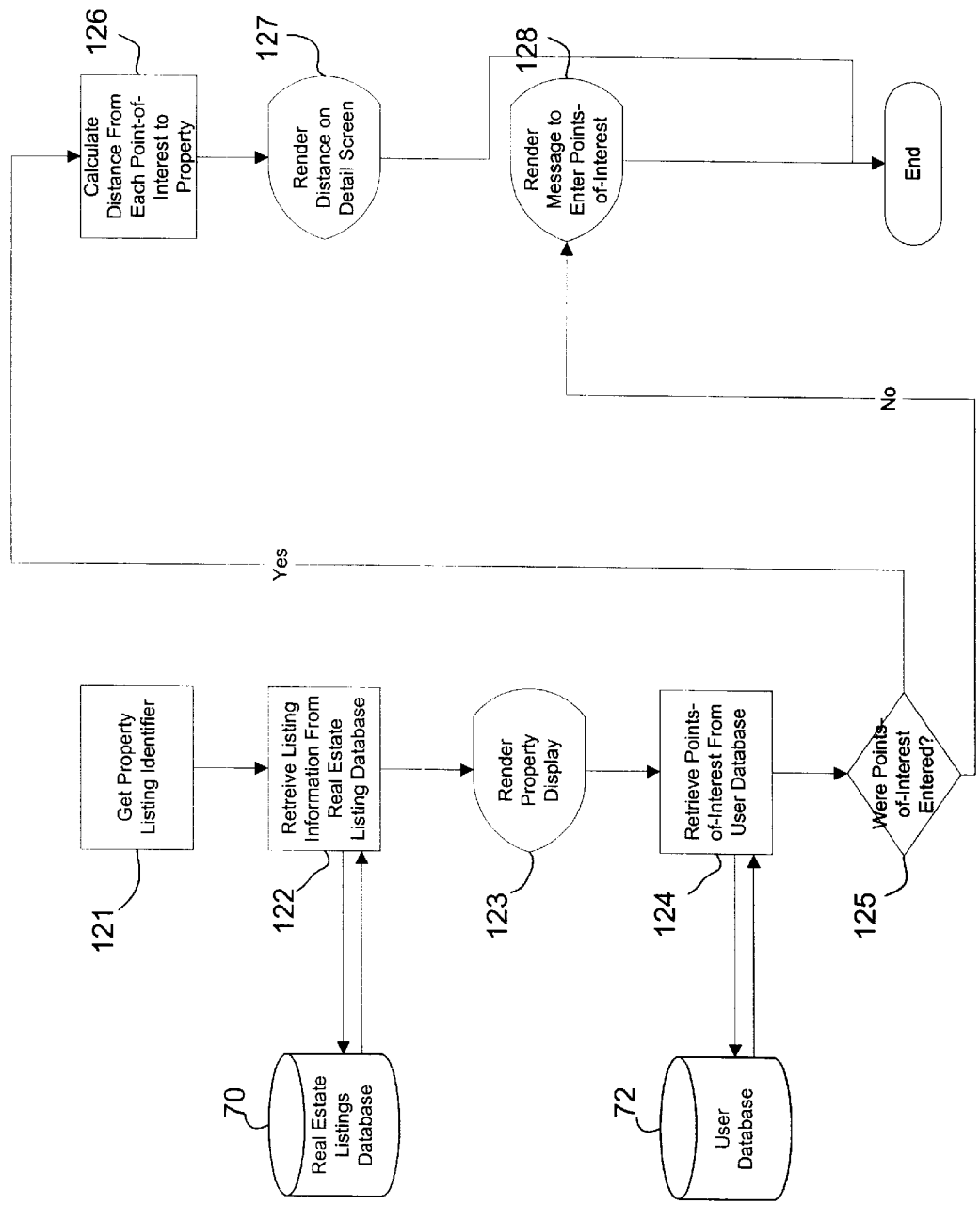
FIG. 5 is a flow diagram in accordance with another aspect of the method of the present invention.

FIG. 5 presents a flow chart of the process for displaying selected properties in reference to the points-of-interest. Here, the user searches for a property by entering an address, selecting it from a list of properties meeting user search criteria, or the like (step 121). After the property is identified, listing information is retrieved from listings database 70, e.g., property photograph 90a (step 122). The property information is then rendered on client computer 20a.

The previously entered and stored points-of-interest are then retrieved from user database 72. If no points-of-interest are available, e.g., they were not entered or they were deleted, a message is displayed on the client computer 128 that indicates to the user the points-of-interest should be entered (steps 125, 128). On the other hand, the previously stored points-of-interest are used to calculate the distance between each point-of-interest and the selected property (steps 125, 126).

Preferably, the geographic information for the points-of-interest and the selected property contains geocodes as described in detail above. Any exemplary calculation for calculating the straight-line distance between a geocode for the selected property and a point-of-interest is shown below:

$$d = R \cdot \frac{\cos^{-1}(\sin(Lat1) \cdot \sin(Lat2) + \cos(Lat1) \cdot \cos(Lat2) \cdot \cos(Long1 - Long2))}{2\pi}$$

where R is the radius of the sphere,
Lat1 is the latitude (in radians) of the $1^{st}$ point,
Long1 is the longitude (in radians) of the $1^{st}$ point,
Lat2 is the latitude (in radians) of the $2^{nd}$ point, and
Long2 is the latitude (in radians) of the $2^{nd}$ point.

As described above, the present invention provides for locating property in an on-line real estate service using points-of-interest. The invention enables a user to determine the location of property in a meaningful way that places the property in the geographic context of shopping centers, schools, mass transportation, and the like.

While the invention is susceptible to various modifications and alternative constructions, certain illustrated embodiments have been shown in the drawings and accompanying detailed description. It should be understood, however, that there is no intention to limit the invention to the specific constructions disclosed herein. On the contrary, the invention is intended to cover all modifications, alternative constructions, and equivalents falling within the scope and spirit of the invention.

What is claimed is:

1. A method for geographically locating a property in a real estate service that contains data for a plurality of properties, comprising the steps of:

accepting from a user searching for a property of interest data indicative of a geographic location of a point-of-interest;

accepting from said user an input indicative of a selection of a property selected from the plurality of properties;

determining the location of the property relative to the point-of-interest; and displaying data indicative of the location of the property relative to the point of interest.

2. The method of claim 1 wherein the step of determining comprises the step of determining substantially the shortest distance from the real estate listing to the point-of-interest.

3. The method as recited in claim 1 wherein the step of determining comprises the step of determining the driving distance from the real estate listing to the point-of-interest.

4. The method as recited in claim 3 wherein the driving distance is calculated in one of kilometers, miles, and time.

5. The method as recited in claim 1 wherein the step of displaying comprises the steps of:

displaying the data stored by the real estate service for the property selected; and displaying the data indicative of the location of the property relative to the point-of-interest.

6. The method as recited in claim 1 further comprising the step of storing the data indicative of said geographic location of the point-of-interest.

7. A computer-readable medium bearing program code for instructing a computer to carry out the steps recited in claim 1.

8. The method as recited in claim 1 wherein the real estate service stores data about the properties on a database server.

9. The method as recited in claim 1 wherein the data indicative of a point-of-interest comprises at least a portion of a postal address.

10. The method as recited in claim 9 further comprising the step of determining a geo-code corresponding to the location of the point-of-interest.

11. The method as recited in claim 10 wherein the step of determining the location of the property in relation to the point of interest comprises the steps of:

determining a geo-code corresponding the property of interest; and calculating the distance between the geo-code corresponding to the property and the geo-code corresponding to the point-of-interest.

12. The method as recited in claim 11 wherein the step of calculating comprises the step of applying the formula:

$$d = R \cdot \frac{\cos^{-1}(\sin(Lat1) \cdot \sin(Lat2) + \cos(Lat1) \cdot \cos(Lat2) \cdot \cos(Long1 - Long2))}{2\pi}$$

where R is the radius of the sphere,

Lat1 is the latitude (in radians) of the $1^{st}$ point,

Long1 is the longitude (in radians) of the $1^{st}$ point,

Lat2 is the latitude (in radians) of the $2^{nd}$ point, and

Long2 is the latitude (in radians) of the $2^{nd}$ point.

13. The method as recited in claim 1 further comprising the step of dynamically determining the location of the property relative to the points-of-interest when the property selected changes.

14. A real estate listing system for providing information about property listings to a client computer over a computer network, comprising:

a server computer capable of electronic communication with the client computer via the computer network;

a database of property listings coupled to the server computer, the serve r computer being capable of selecting properties from the data base in response to client computer commands;

a user specific database coupled to said server computer for storing a geographic location for a point-of-interest that is accepted from the client computer; and a processor for determining a distance between the geographic location for the point-of-interest and a geographic location of a property selected from the database of property listings.

15. The real estate listing system as recited in claim 14 wherein said computer network comprises an Internet connection.

16. The real estate listing system as recited in claim 14 wherein the user specific database is stored on the client computer.

17. The real estate listing system as recited in claim 14 further comprising a display device for displaying the distance between the point-of-interest and the property selected.

18. The real estate listing service as recited in claim 17 wherein the display device is coupled to the client computer.

19. The real estate listing service as recited in claim 18 wherein the display device comprises a computer monitor.

20. The real estate listing service as recited in claim 14 wherein the distance is derived from a straight line distance between the point of interest and the property of interest.

21. The real estate listing service as recited in claim 14 wherein the point-of-interest is defined by a street address.

22. The real estate listing service as recited in claim 21 comprising a software module for converting the street address and property of interest to a geocode.

23. A computer readable medium having computer executable components comprising:

a database component for storing a plurality of property listings;

a user interface component for receiving from a user searching for a property-of-interest a set of points-of-interest;

a user interface component for receiving a selection of said property-of-interest from the plurality of property listings; and a component for determining the location of the property of interest in relation to the points-of-interest.

24. The computer-readable medium as recited in claim 23 further comprising a module for displaying the relation of the property-of-interest to the points-of-interest.

25. The computer readable medium as recited in claim 23 wherein the relation between the property-of-interest and the points-of-interest comprises a distance.

26. The computer readable medium as recited in claim 25 wherein the distance comprises one of miles, kilometers, and time.

27. The computer readable medium as recited in claim 25 wherein the distance comprises a distance between a geocode corresponding to the property of interest and a geocode for each point-of-interest.

28. The computer readable medium as recited in claim 23 further comprising a database component for storing selected points-of-interest.

* * * * *

UNITED STATES PATENT AND TRADEMARK OFFICE
CERTIFICATE OF CORRECTION

PATENT NO.    : 6,397,208 B1
DATED         : May 28, 2002
INVENTOR(S)   : Se-Wai Lee

It is certified that error appears in the above-identified patent and that said Letters Patent is hereby corrected as shown below:

Column 7,
Line 46, insert -- to -- after "corresponding".

Signed and Sealed this

Twenty-first Day of January, 2003

JAMES E. ROGAN
*Director of the United States Patent and Trademark Office*